United States Patent [19]

Baumann et al.

[11] Patent Number: 5,229,507
[45] Date of Patent: Jul. 20, 1993

[54] SUBSTITUTED NAPHTHALOCYANINES AND THEIR USE

[75] Inventors: Marcus Baumann; Hanspeter Stricker, both of Basel; Walter Fischer, Reinach; Jürgen Vogt, Fribourg; Jin Mizuguchi, both of Fribourg, all of Switzerland

[73] Assignee: Ciba-Geigy Corporation, Ardsley, N.Y.

[21] Appl. No.: 614,815

[22] Filed: Nov. 16, 1990

[30] Foreign Application Priority Data

Nov. 22, 1989 [CH] Switzerland .................... 4184/89

[51] Int. Cl.$^5$ .................. C09B 47/04; C09B 47/30
[52] U.S. Cl. ............................... 540/140; 540/130; 430/495; 430/945; 558/414; 558/415; 558/416; 558/423; 558/425
[58] Field of Search .................... 540/130, 140

[56] References Cited

U.S. PATENT DOCUMENTS

| | | | |
|---|---|---|---|
| 4,725,525 | 2/1988 | Kenney et al. | 430/270 |
| 4,904,567 | 2/1990 | Naeda et al. | 430/270 |
| 4,943,681 | 7/1990 | Sato et al. | 430/495 |
| 4,960,538 | 10/1990 | Itoh et al. | 540/130 |

FOREIGN PATENT DOCUMENTS

| | | |
|---|---|---|
| 0262960 | 4/1988 | European Pat. Off. |
| 0279426 | 8/1988 | European Pat. Off. |
| 3622590 | 1/1987 | Fed. Rep. of Germany |
| 2168372 | 6/1986 | United Kingdom |
| 2200650 | 8/1988 | United Kingdom |

OTHER PUBLICATIONS

J. Chem. Soc. Perkin Trans (1988) Michael J. Cook pp. 2453–2458.

*Primary Examiner*—Thurman K. Page
*Assistant Examiner*—Jyothsna Venkat
*Attorney, Agent, or Firm*—Kevin T. Mansfield; Edward McC. Roberts

[57] ABSTRACT

Compounds of the formula I

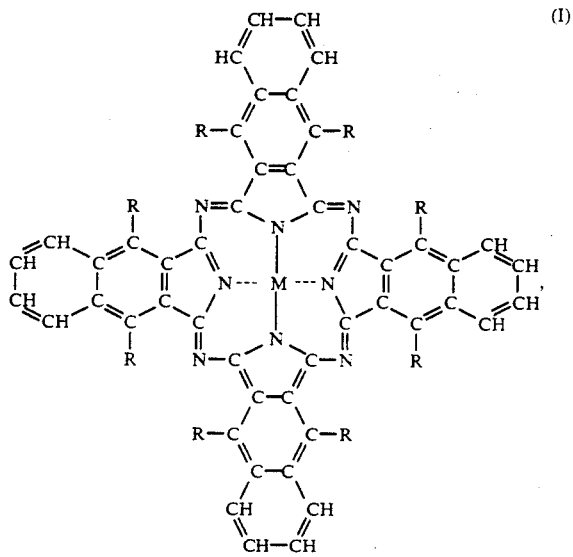

in which R is the group $-(OC_mH_{2m})_n R_1$ and M is two H or is Cu or Ni, $R_1$ is —OH, —Cl, —Br, $C_1$–$C_{30}$alkoxy or —OC(O)$R_2$, m is an integer from 2 to 6 and n is a number from 1 to 20, and $R_2$ is $C_1$–$C_{20}$alkyl, $C_2$–$C_{20}$alkenyl, cyclopentyl, cyclohexyl or $C_6$–$C_{10}$aryl or $C_6$–$C_{10}$arylmethyl which is unsubstituted or substituted by $C_1$–$C_{18}$alkyl.

The compounds are dyes and IR absorbers and can be used for optical information storage systems employing diode lasers.

10 Claims, No Drawings

SUBSTITUTED NAPHTHALOCYANINES AND THEIR USE

The invention relates to tetra-(2,3-naphtho)-tetraazopophins substituted by polyoxyalkylene groups in the 1,4-position (polyoxaalkylenenaphthalocyanines), a process for their preparation, a composition of a substrate and a compound according to the invention and the use of the composition as optical information recording material.

GB-A-2,168,372 describes octaalkoxyphthalocyanines and -naphthalocyanines, and GB-A-2,200,650 describes corresponding metal salts. In J. Chem. Soc. Perkin Trans. I, pages 2453-2458 (1988), M.J. Cook et al. describe octaalkoxynaphthalocyanines and corresponding copper salts. The dyes absorb radiation in the near infra-red region and can be used for laser writing or form image projections using IR lasers.

The present invention relates to compounds of the formula I

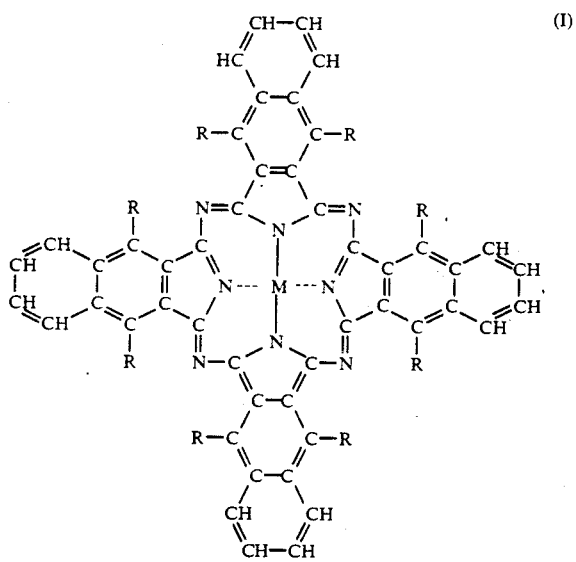

in which R is the group $-(OC_mH_{2m})_n-R_1$ and M is two H or is Cu or Ni, $R_1$ is $-OH$, $-Cl$, $-Br$, $C_1-C_{30}$alkoxy or $-OC(O)R_2$, m is an integer from 2 to 6 and n is a number from 1 to 20, and $R_2$ is $C_1-C_{20}$alkyl, $C_2-C_{20}$alkenyl, cyclopentyl, cyclohexyl or $C_6-C_{10}$aryl or $C_6-C_{10}$arylmethyl which is unsubstituted or substituted by $C_1-C_{18}$alkyl.

In formula, I, M is preferably Ni.

In the group $-(OC_mH_{2m})_n-R_1$, m is preferably an integer from 2 to 4, in particular 2 or 3, and n is preferably 1 to 10, in particular 1 to 5.

The group $-C_mH_{2m}-$ can be, for example, ethylene, 1,2- or 1,4-propylene 1,2-, 1,3-, 1,4or 2,3-butylene, 1,2-, 1,3-, 1,4-, 1,5- or 2,3-pentylene and 1,2-, 1,3-, 1,4-, 1,5-, 2,3- or 3,4-hexylene. Preferred groups are 1,2- or 1,3-propylene and in particular ethylene.

A preferred embodiment comprises compounds of the formula I in which R is the group $-(OCH_2-CH_{2m})-R_1$ in which m is an integer from 1 to 20 and $R_1$ is as defined above.

Alkoxy $R_1$ preferably contains 1 to 18, in particular 1 to 12 especially 1 to 6 C atoms. Examples are methoxy, ethoxy and the isomers of propoxy, butoxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy and eicosyloxy, Alkoxy $R_1$ can be linear or branched.

Alkyl $R_2$ can be linear or branched and can preferably contain 1 to 18, in particular 1 to 12 and especially 1 to 6 C atoms. Examples of suitable alkyl groups are methyl, ethyl and the isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl.

Alkenyl $R_2$ can be linear or branched and can preferably contain 2 to 18, in particular 2 to 12 and especially 2 to 6 C atoms. Examples are allyl, butenyl, pentenyl, hexenyl, heptenyl, octenyl, decenyl, dodecenyl, tetradecenyl, hexadecenyl and octadecenyl.

Aryl $R_2$ is preferably naphthyl or in particular phenyl, and arylmethyl $R_2$ is preferably benzyl. An alkyl substituent of aryl and arylmethyl can be linear or branched and can preferably contain 1 to 12, in particular 1 to 6 C atoms. Some examples are methyl-, ethyl-, dimethyl-, n- or i-propyl-, n- or t-butyl, hexyl-, octyl-, decyl- or dodecylphenyl or -benzyl.

A preferred sub-group comprises those compounds of the formula I in which $R_1$ is $-OH$, $C_1-C_{18}$alkoxy or $-OC(O)-R_2$ and $R_2$ is $C_1-C_{18}$alkyl, phenyl, benzyl, $C_1-C_{12}$alkylphenyl or $C_1-C_{12}$alkylbenzyl. Particularly preferably, $R_1$ is $-OH$, $C_1-C_{12}$ or $-OC(O)-R_2$ and $R_2$ is $C_1-C_{12}$alkyl.

Another preferred sub-group comprises compounds of the formula I in which R is the group $-(OCH_2-CH_{2n})-R_1$ in which n is a number from 1 to 5 and $R_1$ is $C_1-C_{12}$alkoxy. Particularly preferably, n is a number from 1 to 3 and $R_1$ is $C_1-C_4$alkoxy.

The invention furthermore relates to a process for the preparation of compounds of the formula I which comprises a) reacting a compound of the formula II

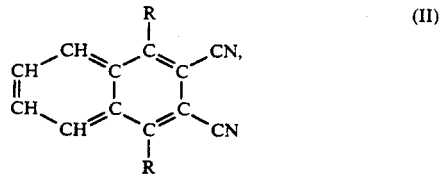

in which R is as defined above, at elevated temperature in a solvent RH and in the presence of at least the equimolar amount of a lithium salt LiR, subsequently liberating the compound of the formula I in which M is two H by hydrolysis, isolating this compound of the formula I and if appropriate b) reacting the compound prepared according to stage a) with at least the equimolar amount of a metal salt $MX_2$, in which M is Cu or Ni and X is the anion of a monobasic acid, in the presence of a solvent.

The compounds of the formula II are novel and the invention likewise relates to these. They can be obtained in a simple manner by reacting 1 equivalent of 1,4-dihydroxy-2,3-dicyanonaphthalene with 2 equivalents of p-toluenesulfonic acid ester of the formula

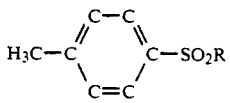

in which R is as defined for formula I, at temperature of advantageously 40° to 150° C. in the presence of a solvent (for example dimethylformamide) and an alkali metal carbonate (for example $K_2CO_3$).

The process according to the invention is advantageously carried out at a temperature of at least 100° C., preferably 100°-200° C. To avoid side reactions, the solvents used are those of the formula RH and the lithium salts used are those of the formula LiR. Lithium salts are obtained, for example, by adding lithium to an excess of solvent RH and then allowing the components to react completely. An excess of lithium salt LiR is advantageously used. The compound of the formula II is then added to the solution of the lithium salts and the mixture is heated. Thereafter, the reaction mixture is allowed to cool and is advantageously hydrolysed with an acid, for example acetic acid. The compounds according to the invention in which M in formula I is two H can then be isolated in a known manner by means of extraction, crystallization and chromatographic methods.

In carrying out process stage b), the compounds obtained by process stage a) are advantageously dissolved in a polar solvent, for example alkanols (for example methanol, ethanol, n- or i-propanol, n- or t-butanol, pentanol, hexanol, heptanol or octanol), halogenated hydrocarbons (for example $CH_2Cl_2$, $CHCl_3$, 1,1,1-trichloroethane or 1,1,2,2-tetrachloroethane) or ethers (for example diethyl ether, di-n-butyl ether, tetrahydrofuran or dioxane). The reaction with a metal salt $MX_2$ can be carried out, for example, at 10° to 150° C., preferably 20° to 80° C. X can preferably be Cl, Br, acetate or acetylacetonate. The metal salts formed, of the formula I, can be purified in the customary manner by crystallization or chromatographic methods.

The compounds according to the invention are brown solid substances which have an absorption maximum in the near IR region (abbreviated to NIR below) at about 850 nm and an absorption minimum (window) at about 780 nm. They are stable to heat and soluble, especially in polar and non-polar substrates, for example solvents, liquid crystals and plastics. The solubility may be a multiple of the solubility of the already known compounds containing alkoxy groups.

This property is particularly advantageous for optoelectronic uses, for example information stores, because the compounds according to the invention can easily be incorporated into plastics as a result of their high solubility and as a result of their good stability to light and heat over a relatively long period of time.

In smectic liquid crystals of chiral compounds which contain a dissolved dye according to the invention, electronic information can be written by means of a laser diode, of, for example, 830 nm. During this operation, the exposed dot melts and becomes milky white after cooling. The information stored in this way can be read with the aid of the change in transmission or reflection. Details of this technique are described in the book "The Physics of Liquid Crystal" (Oxford Press (1975)).

The compounds according to the invention can furthermore be employed as NIR absorbers both for non-erasable and for erasable information storage systems using inexpensive and convenient NIR laser diodes.

A non-erasable system is based on ablation by marking with a laser beam. This technique is described in the literature (Angewandte Chemie, volume 101, pages 1475-1502 (1989)). A recording polymer layer in which one of the NIR dyes according to the invention is dissolved is applied to a substrate of a plastic, for example polycarbonate or polymethyl methacrylate, or of a glass. Information is written in the form of dots using a laser diode of, for example, 830 nm and the information stored is read out again with the aid of the change in transmission or reflection.

The NIR dyes according to the invention can also be used for another non-erasable system based on the viscoelastic properties of polymers. The layer of dye is applied directly to a substrate of plastic (for example polycarbonate), the glass transition point of which is about 100°-160° C. A reflecting metallic layer of, for example, aluminium or gold is applied to this. The substrates of glass or plastic used can also be those which contain the NIR dye according to the invention dissolved in a polymer, the glass transition point of which is about 100°-160° C. Such systems are described, for example, in SPIE volume 1078 "Optical Data Storage Topic Meeting" (1989), pages 80-87. As a result of marking, for example with the laser diode of 830 nm, local expansion of the exposed dot takes place, leading to a change in transmission or reflection.

The compounds according to the invention can furthermore also be used as NIR absorbers for an erasable system based on the viscoelastic properties of polymers. A double layer consisting of an expansion layer and a retention layer which can undergo plastic deformation is used in this system. An elastomer of a crosslinked polymer, for example polyurethane or epoxy resins, the glass transition point of which is about 25° C. can be used in the expansion layer. This layer contains a dye, for example phthalocyanine derivatives, which have a high absorption, for example, at about 690 nm. Highly crosslinked polymers on a thermoplastic basis, for example polyesters, epoxy resins or polycarbonates, which have a glass transition point of about 100°-160° C. can be used for the retention layer. This layer contains at least one of the NIR dyes according to the invention. Such a system is described, for example, in EP-A-0,262,960. Plastics, such as polycarbonates or polymethyl methacrylate, or glasses can be used as the substrate. The concentration of dye in the two layers is between about 0.001 and 10% by weight, preferably between about 0.01 and 3% by weight. The recording double layer can be applied to the substrate, for example, by means of the whirler coating technique, each layer preferably being less than 1 μm thick. If appropriate, a reflecting metallic layer can also be produced by vapour deposition. Information is written in the form of dots using a dye laser of, for example, 690 nm, which first has the effect of local expansion in the expansion layer and finally leads to viscoelastic deformation in the retention layer. The transmission or reflection of the dots described consequently changes, which can be detected with a laser diode of, for example, 780 nm. The information written can be erased either dot-wise using a laser or integrally using a flashlight.

The invention furthermore relates to a composition containing
a) a substrate and b) at least one compound of the formula I in uniform distribution or on at least one surface.

The composition preferably contains the compounds of the formula I in an amount of 0.001 to 10% by weight, in particular 0.01 to 5% by weight, based on the substrate. Substrates into which the compounds of the formula I are incorporated are preferably transparent. The substrate is preferably a liquid crystal material or a plastic.

The plastic can be, for example, a thermoset, a thermoplastic or a structurally crosslinked polymer. Such polymers are familiar to the expert.

The invention furthermore relates to the use of the composition according to the invention as optical information recording material by marking with lasers.

The following examples illustrate the invention in more detail.

A)

PREPARATION OF STARTING COMPOUNDS

EXAMPLES A1–A5

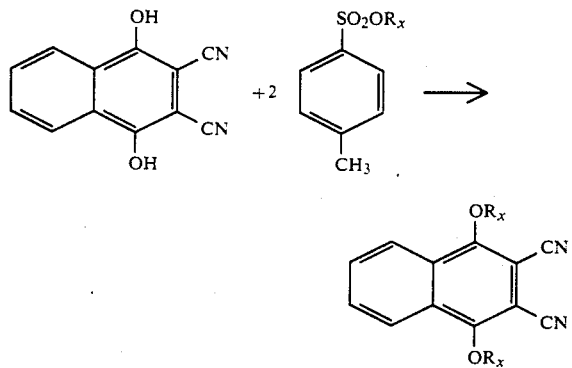

A mixture of 0.12 mol of 1,4-dihydroxy-2,4-dicyanonaphthalene, 0.29 mol of 1-(p-tolylsulfonyloxy)-ester, 0.55 mol of $K_2CO_3$ and 480 ml of dimethylformamide is heated at 85° C. under an $N_2$ atmosphere for 2 hours, while stirring. After cooling, the precipitate is filtered off and the filtrate is evaporated to dryness in vacuo. The residue is dissolved in a 1:1 mixture of ethyl acetate:diethyl ether and the solution is washed with 1N NaOH, 1N HCl and $H_2O$. After drying over $Na_2SO_4$ and evaporation of the solvent, 37.9 g of dark oil are obtained and are recrystallized from methanol. Further information is to be found in Table 1.

TABLE 1

| Example | $R_x$ | Melting point [°C.] | Yield [%] | Note |
|---|---|---|---|---|
| A1 | ⋀⋁OCH₃ | 102–103 | 60.2 | |
| A2 | ⋀⋁O⋀⋁O-n-C₄H₉ | — | 53.3 | a), b) |

TABLE 1-continued

| Example | $R_x$ | Melting point [°C.] | Yield [%] | Note |
|---|---|---|---|---|
| A3 | ⋀⋁O⋀⋁OCH₃ | 50–51 | 43.6 | c) |
| A4 | ⋀⋁OC(O)C₂H₅ | 118–120 | 1.0 | d) |
| A5 | ⋀⋁O⋀⋁Cl | 54–56 | 35.2 | c) | a) Chromatographed, silica gel/$CH_2Cl_2$:$CH_3OH$(98:2).
b) NMR($CHCl_3$): 8.42(m, 2H, aromatic); 7.77(m, 2H, aromatic); 4.6(m, 4H($CH_2$)₂); 3.97(m, 4H($CH_2$)₂); 3.72(m, 4H($CH_2$)₂); 3.6(m, 4H($CH_2$)₂); 3.48(t, 4H($CH_2$)₂); 1.59(m, 4H($CH_2$)₂); 1.34(m, 4H($CH_2$)₂) and 0.9 ppm (t, 6H($CH_3$)₂).
c) Crystallized from diethyl ether
d) Subjected to flash chromatography, $CH_2Cl_2$ + ethyl acetate (1; 5 and 10%).

B)

PREPARATION OF NAPHTHALOCYANINES

EXAMPLE B1

R=—$OCH_2CH_2OCH_3$, M=2H (R and M relates to formula I)

4.9 g (0.7 mol) of lithium are introduced in portions into 250 ml of ethylene glycol monomethyl ether under an $N_2$ atmosphere in the course of one hour, while stirring and cooling. The mixture is then stirred at room temperature for 30 minutes. 22.7 g (0.07 mol) of 1,4-bis(2-methoxy-ethoxy)-2,4-dicyanonaphthalene are added to this solution and the mixture is refluxed (125° C.) for 2 hours. After cooling, 210 ml of acetic acid are added dropwise, while cooling with ice. The mixture is then evaporated to dryness in vacuo. The residue is dissolved in methylene chloride and washed twice with 2N HCl and twice with 10 per cent NaCl solution. After drying over $Na_2SO_4$ and evaporation of the solvent, 20 g of black oil are obtained and are recrystallized from 30 ml of ethyl acetate. 9.5 g (42% of naphthalocyanine are obtained in this manner as brownish fine needles of melting point >280° C. A further 2 g (9%) are isolated from the mother liquor by chromatography over silica gel using methylene chloride:methanol (99:1).

NMR ($CHCl_3$): 9.1 (m, 8H, aromatic); 7.9 (m, 8H, aromatic); 5.37 (t, 16H, $CH_2$); 4.05 (t, 16H, $CH_2$) and 3.5 ppm (s, 24H, $CH_3$).

UV ($CHCl_3$): λmax 856 nm/ε=251500, λmin 784 nm/ε=32000 ("window").

MS (FAB): M⊕ 1307.

The following are prepared analogously using the corresponding alkoxy-diethylene glycols and lithium salts:

TABLE 2

| Example | R | M | Mass spectrum [M⊕] | Melting point [°C.] | λmax/ε | λmin/ε ("window") |
|---|---|---|---|---|---|---|
| B2 | ($OCH_2CH_2$)₂$OCH_3$ | 2H | 1659 | 131–133 | 858 nm/ 166560 | 785 nm/ 20000 |
| B3 | ($OCH_2CH_2$)₂O-n-$C_4H_9$ | 2H | 1995 | 60–62 | 858 nm/ 216800 | 783 nm/ 25000 |

EXAMPLE B4

R=CH$_3$OCH$_2$CH$_2$O—, M=Ni.

A mixture of 262 mg (0.2 mmol) of the compound according to Example B1, 103 mg (0.4 mmol) of nickel acetylacetonate and 20 ml of methylene chloride is stirred at room temperature overnight. It is then chromatographed over 30 g of silica gel using 500 ml of methylene chloride:methanol (98:2). Eluates of 20 ml each are separated off. Eluates 7-13 are combined and the solvent is evaporated off in vacuo. The residue is dried in vacuo at 80° C. 109 mg (40%) of the title compound of melting point >280° C. are obtained in this manner as a brown powder.

Microanalysis (calculated for C$_{72}$H$_{72}$N$_8$O$_{16}$Ni, molecular weight 1364.12): Calculated: C: 63.4%; H: 5.3%; N: 8.2%; Ni: 4.3%. Found: C: 63.7%; H: 5.5%; N: 8.2%; Ni: 4.4%.

MS (FAB): M⊕ 1362.

UV(CHCl$_3$): λmax 841 nm/ε=278,300; λmin 772 nm/ε=27000 ("window").

EXAMPLE B5

R=CH$_3$OCH$_2$CH$_2$O—, M=Cu

The Cu complex prepared analogously to Example B4 using copper acetylacetonate forms mixed crystals with one mol of copper acetylacetonate.

Yield 44%, melting point >280° C.

Microanalysis (calculated for C$_{72}$H$_{72}$N$_8$O$_{16}$Cu.C$_{10}$H$_{14}$O$_4$Cu, molecular weight: 1630.7): Calculated: C: 60.4%; H: 5.3%; N: 6.9%; Cu: 7.8%. Found: C: 60.8%, H: 5.4%; N: 6.9%; Cu: 7.8%.

MS (FAB): M⊕ 1368.

UV-VIS (CHCl$_3$): λmax 847 nm/ε=198,400; λmin 775 nm/ε=22,000 ("window").

USE EXAMPLES

EXAMPLE C1 (NON-ERASABLE SYSTEM)

The compound according to Example B4 is dissolved in dimethylformamide. This dye solution is then mixed for 5 minutes, and dissolved, in two-component epoxy resin (65 parts by weight of glycidylated phenol novolak and 35 parts by weight of 1,4-butanediol diglycidyl ether, curing agent: 55 parts by weight of bis(3-methyl-4-aminocyclohex-1-yl)methane, 40 parts by weight of isophoronediamine, 3.5 parts by weight of 1,3,5-tris(-dimethylaminomethyl)-phenol, 1.5 parts by weight of salicylic acid) (glass transition point range: 94°-110° C.) using an ultrasonic bath. The solution is applied to a glass substrate by means of a whirler coater and is then dried at 40° C. in vacuo for two hours. Thereafter, this layer is heated at 80° C. for 8 hours and crosslinked. The absorption maximum is 845 nm. The dye concentration is 0.3% by weight. The layer is about 1 μm thick. Aluminium in a layer about 1500 Å thick is vapour-deposited onto this layer. The recording layer is exposed in the form of dots using a laser diode of 830 nm. The resulting change in reflection is measured at an identical wavelength by means of a microscope spectrophotometer (USMP 80 from Carl Zeiss). The reflection decreases from 70% to 35% as a result of the laser marking.

EXAMPLE C2 (ERASABLE SYSTEM)

Aluminium is vapour-deposited onto a glass substrate in vacuo (layer about 3000 Å thick). An expansion layer of a two-component epoxy resin (55 parts by weight of epoxidized bisphenol A, 45 parts by weight of polypropylene glycol diglycidyl ether, curing agent: 70 parts by weight of a reaction product of 7 parts by weight of 1,4-butanediol diglycidyl ether with 58 parts by weight of dimerized C$_{18}$-fatty acid and 35 parts by weight of hexahydrophthalic anhydride, and 30 parts by weight of n-dodecylsuccinic anhydride, with the addition of catalytic amounts of dimethylbenzylamine) (glass transition point range −19° to 0° C.) and a copper phthalocyanine (substituted by 2.5 SO$_3$H and 1.5 SO$_2$NHC$_6$-H$_4$—CONHCH$_2$CH$_2$SO$_2$CH$_2$CH$_2$OSO$_3$H) is applied to the aluminium. The layer is produced as in Example C1, with the exception of the conditions of the preheating (one hour at 60° C.) and the crosslinking (one hour at 120° C.). The absorption maximum is 676 nm. the layer is about 1.2 μm thick. The retention layer, which consists of the NIR dye according to Example B5 and the same epoxy resin as in Example C1 is then applied. The production of the layer and the crosslinking conditions are as in Example C1. The absorption maximum of the NIR dye in the polymer is 858 nm. The concentration of the dye in the polymer is 0.25% by weight. The layer is about 0.8 μm thick. The recording layer is exposed in the form of dots with a dye laser (dye: cresyl violet (670 nm)). The resulting change in reflection is measured at 780 nm by means of a microscope spectrometer (see Example C1). A decrease in reflection from 55% to 30% is found as a result of the laser marking. The information stored is then erased integrally using a flashlight. The process of writing, reading and erasing is repeated 30 times, no noticeable reduction in the decrease in reflection being found.

What is claimed is:

1. A compound of the formula I

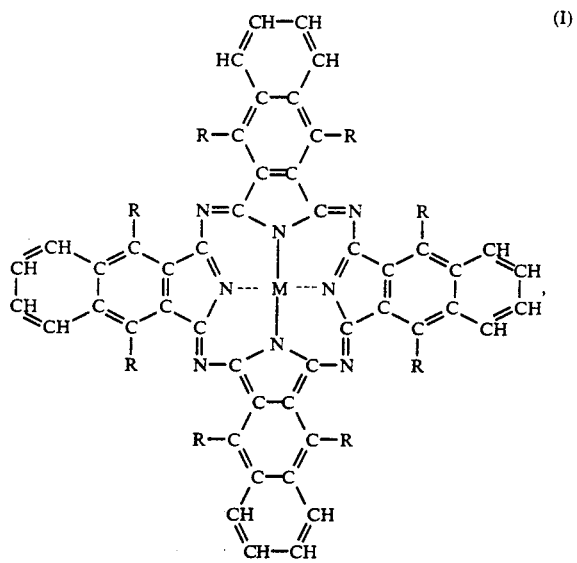

in which R is the group $-(OC_mH_{2m})_n$ R$_1$ and M is two H or is Cu or Ni, R$_1$ is —OH, —Cl, —Br, C$_1$-C$_{30}$alkoxy or —OC(O)R$_2$, m is an integer from 2 to 6 and n is a number from 1 to 20, and R$_2$ is C$_1$-C$_{20}$alkyl, C$_2$-C$_{20}$alkenyl, cyclopentyl, cyclohexyl or C$_6$-C$_{10}$aryl or C$_6$-C$_{10}$aryl-methyl where aryl unsubstituted or substituted by C$_1$-C$_{18}$alkyl.

2. A compound according to claim 1, in which M in formula I is Ni.

3. A compound according to claim 1, in which m is an integer from 2 to 4.

4. A compound according to claim 3, in which m is 2 or 3.

5. A compound according to claim 1, in which n is a number from 1 to 10.

6. A compound according to claim 1, in which R in formula I is the group $-(OCH_2-CH_2)_m-R_1$, in which m is an integer from 1 to 20 and $R_1$ is as defined in claim 1.

7. A compound according to claim 1, in which $R_1$ is $-OH$, $C_1-C_{18}$alkoxy or $-OC(O)-R_2$ and $R_2$ is $C_1-C_{18}$alkyl, phenyl, benzyl, $C_1-C_{12}$alkylphenyl or $C_1-C_{12}$alkylbenzyl.

8. A compound according to claim 7, in which $R_1$ is $-OH$, $C_1-C_{12}$alkoxy or $-OC(O)-R_2$ and $R_2$ is $C_1-C_{12}$alkyl.

9. A compound according to claim 1, in which R in formula I is the group $-(OCH_2-CH_2)_n-R_1$, in which n is a number from 1 to 5 and $R_1$ is $C_1-C_{12}$alkoxy.

10. A compound according to claim 9, in which n is number from 1 to 3 and $R_1$ is $C_1-C_4$alkoxy.

* * * * *